US010847878B2

(12) United States Patent
Hashimoto et al.

(10) Patent No.: US 10,847,878 B2
(45) Date of Patent: Nov. 24, 2020

(54) IMPLANTABLE INSTRUMENT

(71) Applicant: PANASONIC INTELLECTUAL PROPERTY MANAGEMENT CO., LTD., Osaka (JP)

(72) Inventors: Masaru Hashimoto, Osaka (JP); Hideaki Yamaguchi, Osaka (JP); Satoshi Kitamura, Osaka (JP); Junya Sakemi, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/481,746

(22) PCT Filed: Jan. 31, 2018

(86) PCT No.: PCT/JP2018/003076
§ 371 (c)(1),
(2) Date: Jul. 29, 2019

(87) PCT Pub. No.: WO2018/143225
PCT Pub. Date: Aug. 9, 2018

(65) Prior Publication Data
US 2019/0372213 A1 Dec. 5, 2019

(30) Foreign Application Priority Data

Feb. 2, 2017 (JP) .................................. 2017-017969

(51) Int. Cl.
*H01Q 1/38* (2006.01)
*H01Q 1/52* (2006.01)
(52) U.S. Cl.
CPC ................. *H01Q 1/52* (2013.01); *H01Q 1/38* (2013.01)

(58) Field of Classification Search
CPC ............ H01Q 1/38; H01Q 1/52; H01Q 1/243; H01Q 21/28; H01Q 1/22; H01Q 5/10;
(Continued)

(56) References Cited

U.S. PATENT DOCUMENTS 10,397,453 B2 * 8/2019 Choi ...................... H04N 5/247
10,629,982 B2 * 4/2020 Kim ........................ H01Q 1/243
(Continued)

FOREIGN PATENT DOCUMENTS

CN 104899770 A 9/2015
CN 205594790 U 9/2016
(Continued)

OTHER PUBLICATIONS

International Search Report and Written Opinion issued in International Patent Application No. PCT/JP2018/003076, dated May 1, 2018; with English translation.

Primary Examiner — Haissa Philogene
(74) Attorney, Agent, or Firm — McDermott Will & Emery LLP

(57) ABSTRACT

An implantable instrument includes a first housing having a front surface having an opening, a second housing having at least part embedded in a building member, a touch panel display, four antennas for wireless communication, and a control board. The second housing is disposed to face a rear surface of the first housing to form an accommodation space between the first housing and the second housing. The touch panel display includes: a display section having a plate-like shape; and a fixing member having a plate-like shape, being disposed to face a rear surface of the display section, and fixing the display section to the first housing. The touch pane display is disposed in the accommodation space so that the display section is visually perceivable through an opening.

(Continued)

The antenna is disposed at a location not overlapping the fixing member in a thickness direction of the fixing member.

20 Claims, 6 Drawing Sheets

(58) Field of Classification Search
CPC ............ H04M 1/0266; H04M 2250/22; H04B 1/3888; H04B 5/0006
See application file for complete search history.

(56) References Cited

U.S. PATENT DOCUMENTS

| | | |
|---|---|---|
| 2010/0245265 A1 | 9/2010 | Sato et al. |
| 2013/0038560 A1 | 2/2013 | Sato et al. |
| 2015/0005045 A1 | 1/2015 | Sato et al. |
| 2015/0077401 A1 | 3/2015 | Sugiyama |
| 2018/0067373 A1* | 3/2018 | Kimura ................. G02F 1/1677 |
| 2019/0273336 A1* | 9/2019 | Lee ...................... H01R 12/712 |

FOREIGN PATENT DOCUMENTS

| | | |
|---|---|---|
| CN | 205788209 U | 12/2016 |
| CN | 205792935 U | 12/2016 |
| JP | 2010-239211 A | 10/2010 |
| JP | 2012-059580 A | 3/2012 |
| JP | 2012-174513 A | 9/2012 |
| JP | 2014-204153 A | 10/2014 |
| JP | 2015-061210 A | 3/2015 |
| JP | 2015-079399 A | 4/2015 |

\* cited by examiner

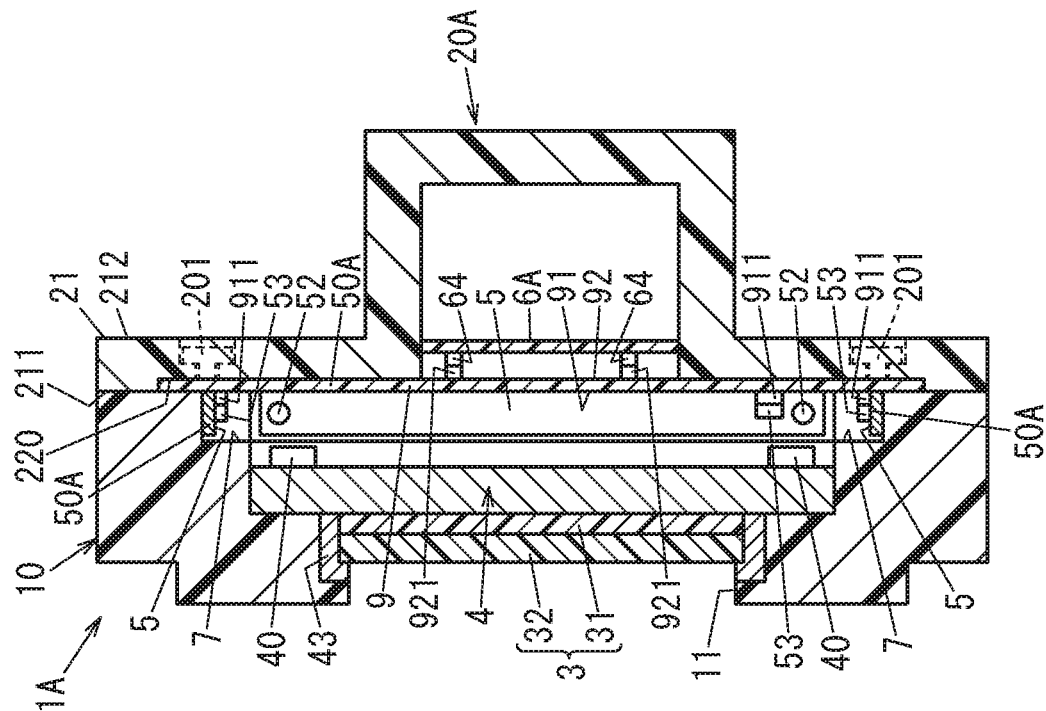
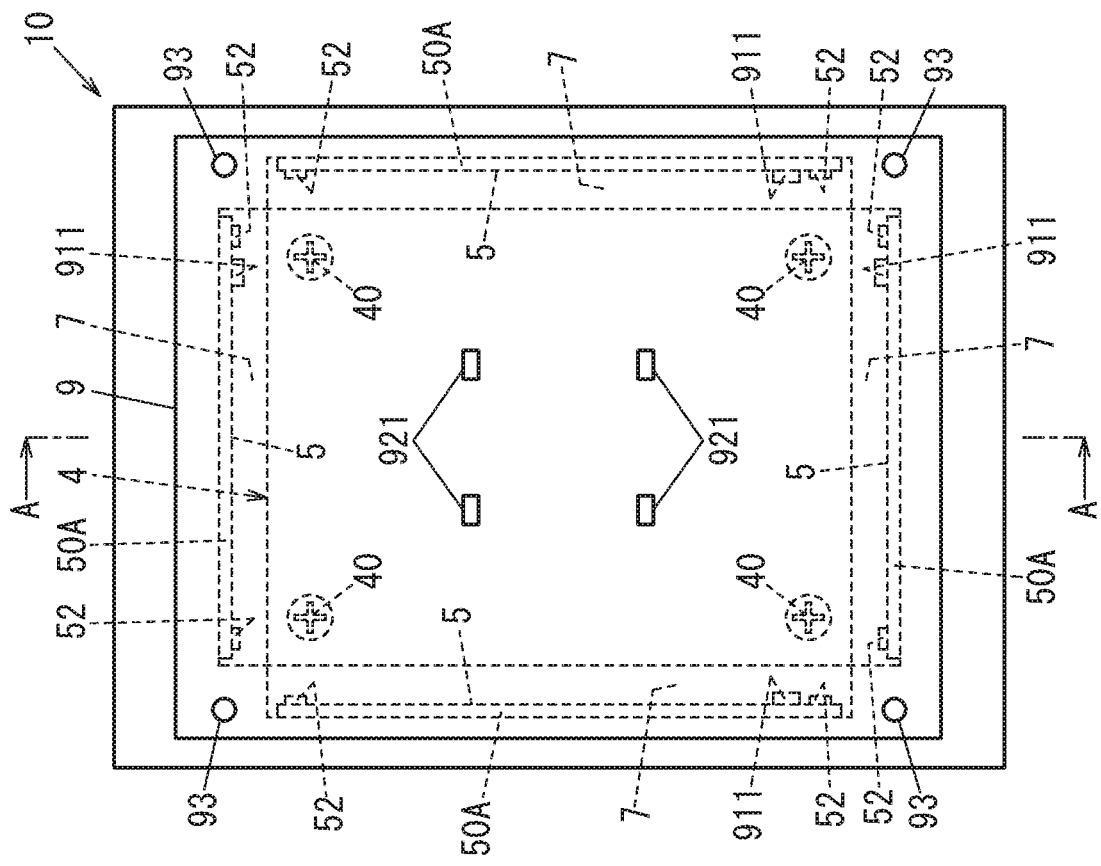

IMPLANTABLE INSTRUMENT

CROSS-REFERENCE OF RELATED APPLICATIONS

This application is the U.S. National Phase under 35 U.S.C. § 371 of International Patent Application No. PCT/JP2018/003076, filed on Jan. 31, 2018, which in turn claims the benefit of Japanese Application No. 2017-017969, filed on Feb. 2, 2017, the entire disclosures of which Applications are incorporated by reference herein.

TECHNICAL FIELD

The present disclosure generally relates to implantable instruments, and more specifically to an implantable instrument to be implanted in a building member.

BACKGROUND ART

A remote controller installed on a wall surface and including a display section and an operation input section disposed on an outer surface of a housing and a controller disposed inside the housing has been known (e.g., see Patent Literature 1). The display section and the operation input section are exposed on a surface on an opposite side of the housing from a surface of the housing facing the wall surface. The controller includes a wireless communication section configured to perform wireless communication.

The wireless communication section in the remote controller described in the Patent Literature 1 is disposed between the wall surface and the display section. Thus, the display section may block radio waves for the wireless communication, which may render wireless communication unstable.

CITATION LIST

Patent Literature

Patent Literature 1: JP 2015-61210 A

SUMMARY OF INVENTION

In view of the foregoing, it is an object of the present disclosure to provide an implantable instrument for which the status of wireless communication is not susceptible to be unstable.

An implantable instrument according to one aspect of the present disclosure includes a first housing, a second housing, a touch panel display, at least one antenna for wireless communication, and a control board. The first housing includes a front surface having an opening. The second housing is disposed to face a rear surface of the first housing to form an accommodation space between the first housing and the second housing. The second housing includes at least a part implanted in a building member. The touch panel display includes a display section having a plate-like shape and a fixing member having a plate-like shape. The fixing member is disposed to face a rear surface of the display section. The fixing member fixes the display section to the first housing. The touch panel display is disposed in the accommodation space such that a front surface of the display section is visually perceivable through the opening. The control board has a function of performing wireless communication via the at least one antenna and a function of controlling the display section in accordance with a communication content of the wireless communication. The control board is disposed in the accommodation space. The at least one antenna is disposed at a location not overlapping the fixing member in a thickness direction of the fixing member.

BRIEF DESCRIPTION OF DRAWINGS

FIG. 6A is a back view illustrating a main part of an implantable instrument according to a fourth variation of the embodiment of the present disclosure, and FIG. 6B is a sectional view illustrating the implantable instrument taken along line A-A of FIG. 6A.

DESCRIPTION OF EMBODIMENTS

An implantable instrument according to an embodiment of the present disclosure will be described below with reference to FIGS. 1 to 5. Note that the embodiment described below is a mere example of various embodiments of the present disclosure. Various modifications may be made to the following embodiment depending on design and the like as long as the object of the present disclosure is achieved. Moreover, figures described in the following embodiment are schematic views. The ratio of sizes and the ratio of thicknesses of components in FIGS. 2 to 5 do not necessarily reflect actual dimensional ratios.

(1) Schema of Implantable Instrument

Figure 1:
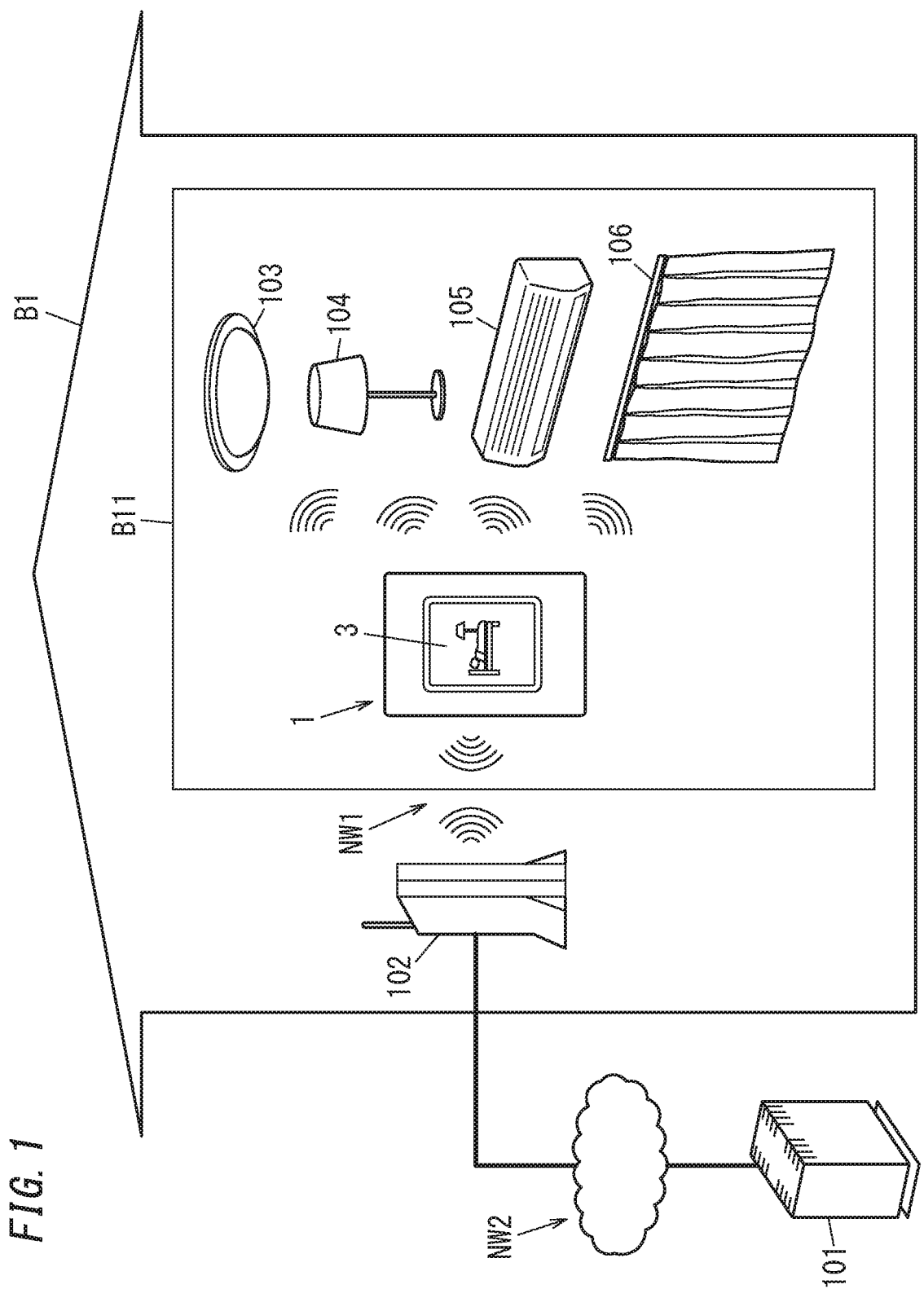
FIG. 1 is a view schematically illustrating a building provided with an implantable instrument according to an embodiment of the present disclosure.

As illustrated in FIG. 1, an implantable instrument 1 includes a touch panel display 3. The touch panel display 3 has a function of sensing a touch operation given by a user and a function of displaying characters and images. The implantable instrument 1 is disposed in a room B11 (e.g., bedroom) of a building B1 such as a detached dwelling house. The implantable instrument 1 is implanted in, for example, a building member 200 (see FIG. 5) such a as a wall material. The implantable instrument 1 is a switching device configured to perform wireless communication with specific apparatuses disposed in the room B11 to control a state of each specific apparatuses. The implantable instrument 1 transmits, to each specific apparatus, control information for controlling a corresponding one of the specific apparatuses in accordance with a content of an operation given via the touch panel display 3. A wireless communication scheme is a communication scheme based on a radio wave as a medium and is, for example, Wi-Fi (registered trademark), Bluetooth (registered trademark), or a wireless communication scheme conforming to specific small power wireless communication. Note that the implantable instrument 1 may switch between a state where electric power is supplied to the specific apparatus and a state where the electric power is not supplied to the specific apparatus, instead of transmitting the control information to the specific apparatus. For example, when the specific apparatus is an apparatus such as a lighting fixture configured to switch an operational state between a state where electric power is supplied and a state where electric power is not supplied, the implantable instrument 1 may switch a supply state of electric power by using a relay circuit to control the specific apparatus.

Examples of the specific apparatus includes a ceiling lamp 103, a stand light 104, an air conditioner 105, and a curtain 106 which is electrically operated. The specific apparatus is configured to, in accordance with the control information transmitted from the implantable instrument 1, perform switching between a stop state and an operational state and a change of the operational state. The ceiling lamp 103 and the stand light 104 are configured to, in accordance with the control information received, perform switching between a non-lighting state and a lighting state and a change of a dimming state. The air conditioner 105 is configured to, in accordance with the control information received, perform switching between a stop state and an operational state, and a change of a set temperature, an air volume, an air direction, or the like. The curtain 106 switches, in accordance with the control information received, between a closed state where the curtain 106 covers a window and an open state where the window is exposed. When receiving, for example, the control information, the specific apparatus outputs a sound to notify a user around the specific apparatus of a change of the state. Note that the specific apparatus may be an induction cooking appliance or the like disposed in, for example, a kitchen or an electric shutter installed outside the building B1 other than the apparatus.

The implantable instrument 1 is configured to, when a user gives a prescribed operation via the touch panel display 3 to achieve an environment comfortable to sleep in the room B11, transmit, to the specific apparatus, control information for achieving the environment comfortable to sleep in the room B11. This control information causes the ceiling lamp 103 and the stand light 104 to be in the non-lighting state, adjusts the air conditioner 105 to a temperature suitable for sleep, for example, in the room B11, and causes the curtain 106, which is electrically operated, to be in the closed state. Moreover, the touch panel display 3 displays an image indicating that the control information for achieving an environment comfortable for sleep is transmitted to the specific apparatus.

The implantable instrument 1 is configured to perform wireless communication with, for example, a gateway apparatus 102 in addition to the specific apparatus. The gateway apparatus 102 is a gateway apparatus configured to connect an internal network NW1 in the building B1 to an external network NW2 different from the internal network NW1. The external network NW2 is, for example, a public communication network such as the Internet. The implantable instrument 1 is configured to communicate with a server device 101 connected via the gateway apparatus 102 to the external network NW2. The implantable instrument 1 is configured to acquire, from the server device 101, for example, control information and a program and the like for generating control information and hold the control information and the program. Thus, the implantable instrument 1 enables the control information and the program to be rewritten with control information and a program acquired from the server device 101. Note that a configuration which allows the implantable instrument 1 to communicate with the gateway apparatus 102 and the server device 101 may be omitted. The implantable instrument 1 may be configured to communicate with, for example, a communication terminal such as a smartphone or a tablet terminal.

(2) Configuration of Implantable Instrument

The implantable instrument 1 will be described with reference to FIGS. 2, 3A and 3B.

Figure 2:
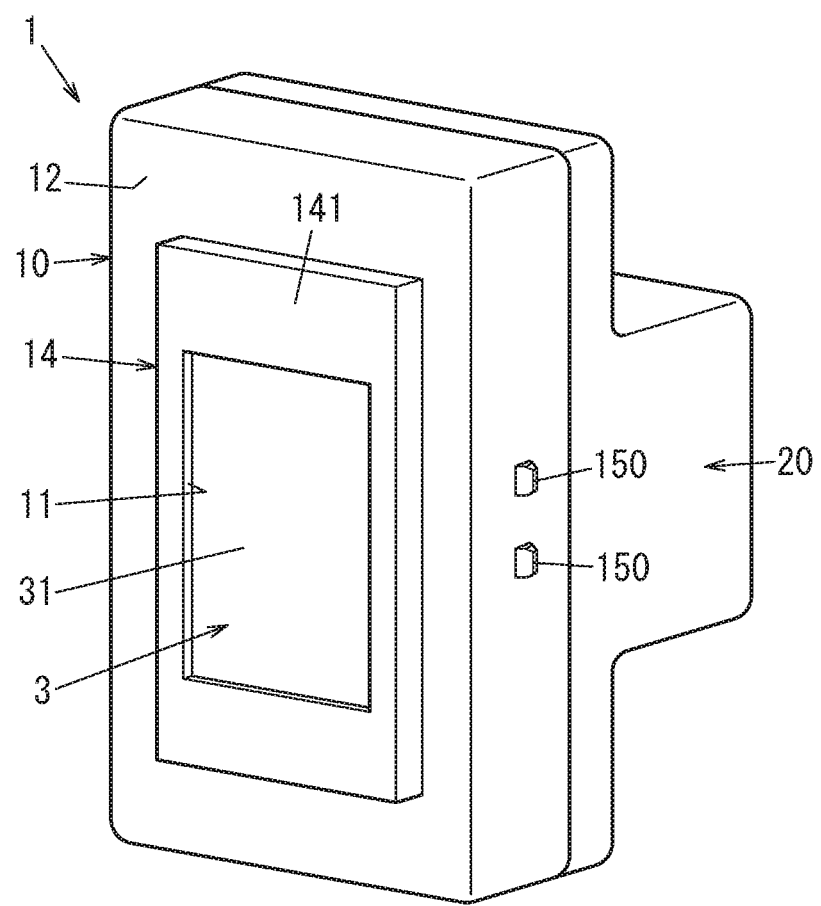
FIG. 2 is a perspective view illustrating the implantable instrument.

As illustrated in FIG. 2, the implantable instrument 1 includes a first housing 10, a second housing 20, and the touch panel display 3. As illustrated in FIGS. 3A and 3B, the implantable instrument 1 further includes a fixing member 4, a plurality of (in this embodiment, four) antennas 5, and a control board 6. Note that FIG. 3A shows the implantable instrument 1 viewed from a rear surface side, and in FIG. 3A, the second housing 20 and control board 6 are omitted for the sake of description.

Figure 5:
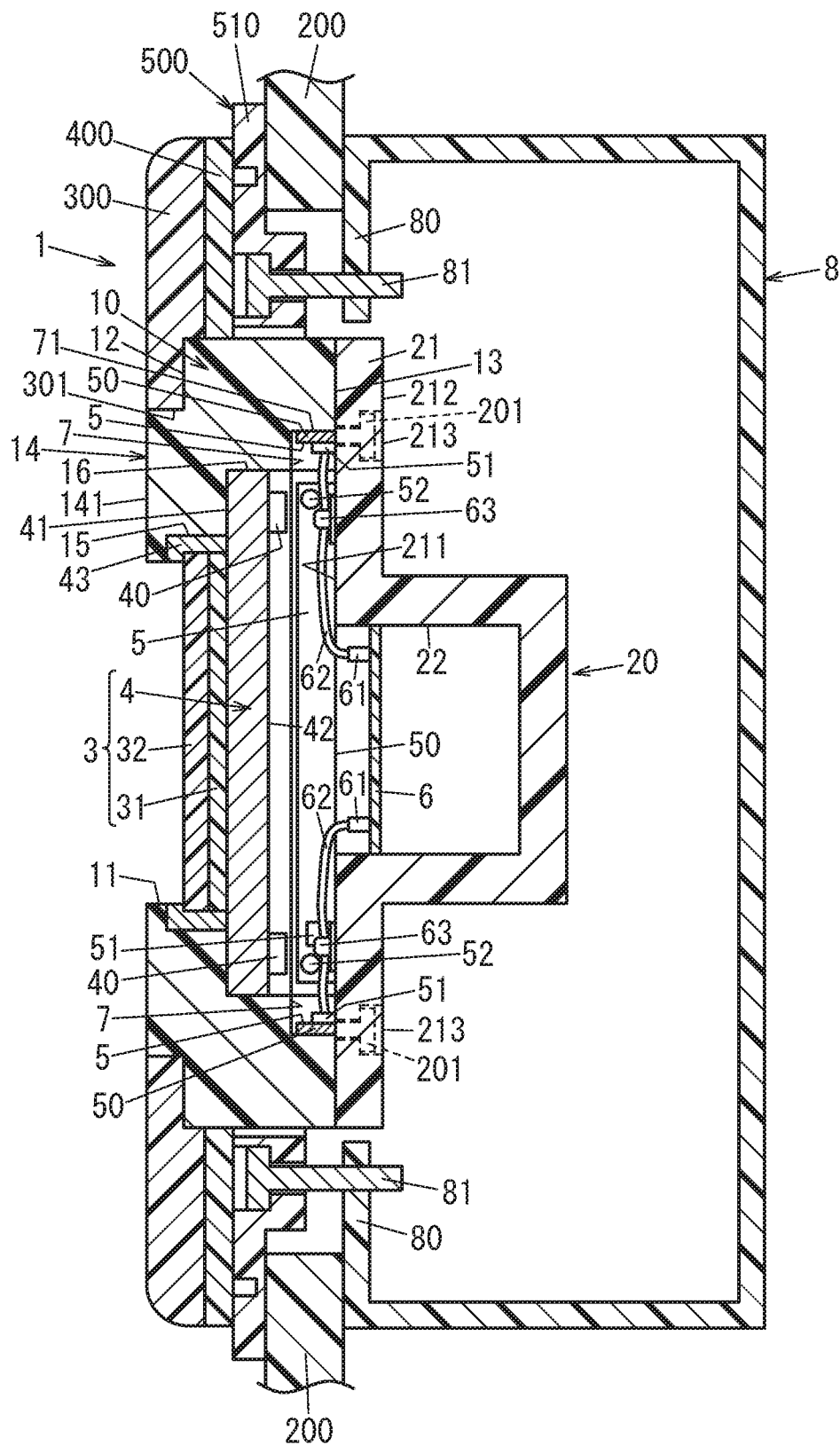
FIG. 5 is a sectional view illustrating a state where the implantable instrument is implanted in a building member.

In the implantable instrument 1, at least part of the second housing 20 is implanted in the building member 200 (see FIG. 5). Saying that "the at least part of the second housing 20 is implanted in the building member 200" means that the at least part of the second housing 20 is disposed in an inside space of a wall formed of the building member 200.

In a state where the implantable instrument 1 is implanted in the building member 200 and is viewed from the front, the left-right direction is defined as a first direction, the up-down direction is defined as a second direction, and the front-rear direction is defined as a third direction. Note that the directions are merely exemplarily defined as, but not limited to, the first to third directions.

Figure 3A:
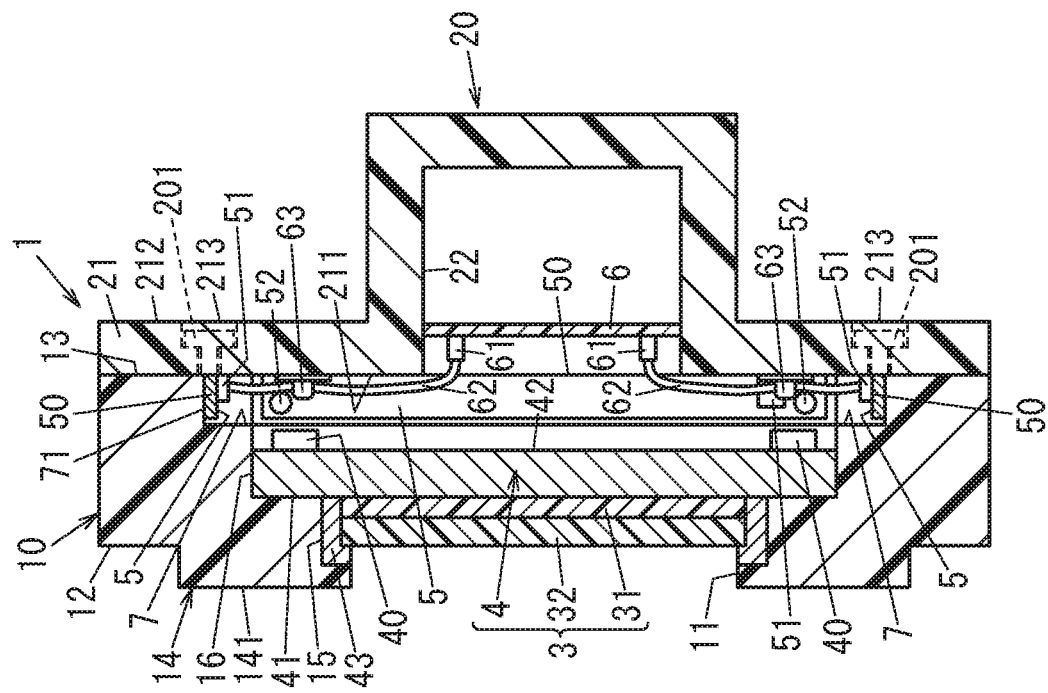
FIG. 3A is a back view illustrating a main part of the implantable instrument.
Figure 3B:
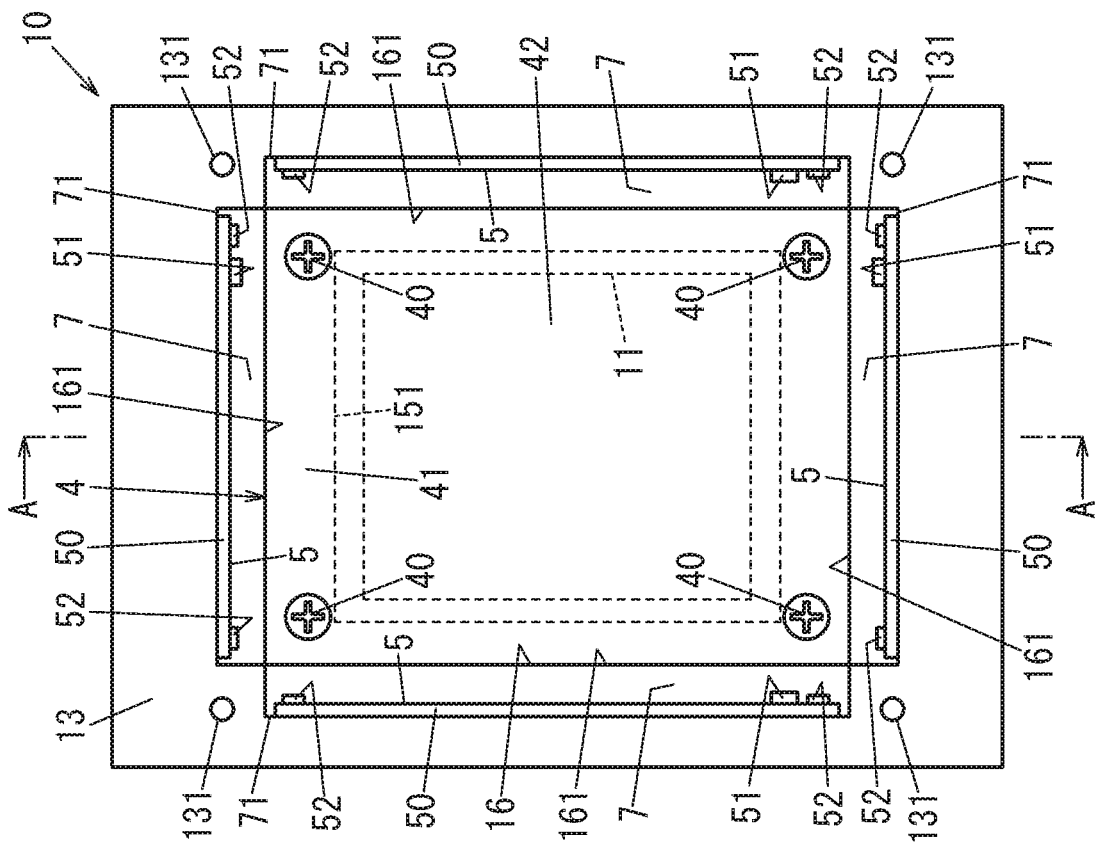
FIG. 3B is a sectional view illustrating the implantable instrument taken along line A-A of FIG. 3A.

As illustrated in FIG. 3B, the touch panel display 3 includes a display section 31, a sensor 32, and the fixing member 4. The display section 31 includes, for example, a liquid crystal display and has a quadrangular outer shape when viewed in a thickness direction thereof. The sensor 32 includes, for example, a resistive pressure sensor and is light-transmissive in a thickness direction thereof. The sensor 32 is disposed on a front surface of the display section 31. When a user gives a push operation to a surface of the sensor 32, the sensor senses the push operation and outputs a sensing result to the control board 6. The sensor 32 has a quadrangular outer shape substantially the same in size as the display section 31. Note that the display section 31 may be, for example, an organic electroluminescence display or electronic paper instead of the liquid crystal display. The sensor 32 may sense a location of the push operation in addition to whether or not the push operation is given. Moreover, a sensing method of the sensor 32 may be, for example, a capacitive method.

As illustrated in FIG. 3B, the fixing member 4 includes a rear panel 42 and a holder 43. The fixing member 4 is formed of, for example, a metal material (e.g., iron or aluminum). The rear panel 42 is formed as a plate having a quadrangular outer shape. Lengths of the rear panel 42 in the first direction and the second direction are respectively longer than lengths of the touch panel display 3 in the first direction and the second direction. The touch panel display 3 is disposed in a central portion on a front surface of the rear panel 42. A thickness direction of the fixing member 4 corresponds to a thickness direction of the rear panel 42 and is, for example, the third direction.

The holder 43 is provided on the front surface of the rear panel 42 to protrude from the front surface of the rear panel 42 in the third direction. The holder 43 covers edge portions of the sensor 32 of the touch panel display 3 to hold the touch panel display 3 on the front surface of the rear panel 42.

Here, part of the rear panel 42 located outside the holder 43 is referred to as a first attachment 41. The first attachment 41 is a plate-like portion extending from both edges of the holder 43 in the first direction and the second direction. As illustrated in FIG. 3A, the first attachment 41 has four corners having respective four through holes through each of which a thread portion of a first screw 40 is to be inserted.

The first housing 10 is made of, for example, an electrically insulative material such as a synthetic resin material. The first housing 10 has a front surface 12 and a rear surface 13 and has a flat shape, and the front surface 12 has a quadrangular outer shape viewed in the third direction. For example, the outer shape of the front surface 12 has a length longer in the second direction than in the first direction.

The first housing 10 has an opening 11. The opening 11 has a quadrangular shape when viewed in a direction orthogonal to the front surface 12. The opening is formed in a central portion of the first housing 10. Four sides of the opening 11 are substantially parallel to respective four sides of the front surface 12 of the first housing 10. The opening 11 is provided to expose the touch panel display 3 from the front surface 12. Around the opening 11, a projection 14 protruding frontward from the front surface 12 is formed. The projection 14 has a front surface 141 which is substantially parallel to the front surface 12 of the first housing 10.

The first housing 10 has side surfaces which are located on both sides in the first direction and one of which is provided with a pair of claws 150. The pair of claws 150 is aligned along the second direction and is provided in the central portion of the first housing 10 in the second direction. The pair of claws 150 is provided to fix the first housing 10 to a mounting frame 500 (see FIG. 4) which will be described later. The first housing 10 has the other side surface which is provided with a pair of claws not shown in the same way. The pair of claws provided on the other side surface is configured in a similar manner to the pair of claws 150.

The first housing 10 has a first recess 15, a second recess 16, and a plurality of (in this embodiment, four) dents 7.

As illustrated in FIGS. 3A and 3B, the second recess 16 is open toward the rear surface 13 of the first housing 10 and is recessed toward the front surface 12 of the first housing 10. The second recess 16 has a bottom surface orthogonal to the third direction. The second recess 16 has four inner side surfaces 161 parallel to the third direction, and when viewed in the third direction, the second recess 16 has a quadrangular outer shape substantially the same as the outer shape of the first attachment 41 of the touch panel display 3. The second recess 16 is provided to accommodate the first attachment 41. The inner side surfaces 161 of the second recess 16 each have a dimension in the third direction larger than the thickness of the first attachment 41 of the fixing member 4. Thus, the second recess 16 can accommodate the first attachment 41 without the first attachment 41 extending beyond the second recess 16. The bottom surface of the second recess 16 has four corners having respective four screw holes into each of which the first screw 40 is screwed.

The bottom surface of the second recess 16 has the first recess 15 which is slightly smaller than the second recess 16. The first recess 15 has a bottom surface surrounded by an inner side surface 151, and in the bottom surface, a through hole penetrating through the bottom surface in the third direction is formed. The through hole corresponds to the opening 11. When viewed in the third direction, the first recess 15 has a quadrangular outer shape substantially the same as the outer shape of the holder 43 of the touch panel display 3. The first recess 15 is provided to accommodate the holder 43 and the display section 31 of the touch panel display 3.

The four dents 7 are provided between each of the four inner side surfaces 161 of the second recess 16 and the rear surface 13 of the first housing 10. The four dents 7 are provided at locations corresponding to the respective four inner side surfaces 161 of the second recess 16. When viewed in the third direction, the four dents 7 are recessed toward the outer side of the first housing 10 from edges which are included in edges of the inner side surfaces 161 of the second recess 16 and which face the rear surface 13 of the first housing 10. Each dent 7 has a width substantially equal to the length of an edge which is included in the edges of the inner side surfaces 161 corresponding to the dents 7 and which faces the rear surface 13 of the first housing 10. Each dent 7 has an edge which is located on an opposite side from a corresponding one of the edges of the second recess 16 and which is flush with the rear surface 13 of the first housing 10. The four dents 7 are provided to accommodate the four antennas 5. The four dents 7 forms a continuous space in the accommodation space when the second housing 20 is attached to the first housing 10.

Each dent 7 has an inner side surface 71 transverse to the rear surface 13 of the first housing 10. Each inner side surface 71 is a surface parallel to a corresponding one of the edges of the inner side surfaces 161 to which the dents 7 correspond. As illustrated in FIG. 3A, the inner side surface 71 has two screw holes into which respective two screws 52 are to be screwed. The two screw holes are provided on respective ends of each dent 7.

In the accommodation space formed by the first housing 10 and the second housing 20, the first recess 15, the second recess 16, and the four dents 7 are included.

As illustrated in FIG. 3A, the rear surface 13 of the first housing 10 has four screw holes 131. The four screw holes 131 are formed in respective four corners of the rear surface 13. An interval between two screw holes 131 which are included in the four screw holes 131 and which are aligned in the first direction is larger than an interval in the first direction of the inner side surfaces 161 of the second recess 16. An interval between two screw holes 131 which are included in the four screw holes 131 and which are aligned in the second direction is larger than an interval in the second direction of the inner side surfaces 161 of the second recess 16. Thus, it can be said that the four screw holes 131 are provided on the outer side of the second recess 16. Four second screws 201 are screwed into the respective four screw holes 131.

Each of the antennas 5 is an antenna (so-called pattern antenna) configured to transmit and receive radio waves via a printed circuit portion provided on a substrate 50 such as a glass epoxy board. The substrate 50 of each antenna 5 includes a connector 51 to be connected to a cable 62. The connector 51 is electrically connected to the printed circuit portion of the substrate 50.

The substrate 50 has a strip-plate-like outer shape when viewed in the thickness direction thereof. The plurality of antennas 5 correspond to the plurality of dents 7 on a one-the-one basis and are each provided to a corresponding one of the dents 7. The plurality of antennas 5 are disposed in the dents 7 such that a surface of the substrate 50 is parallel to the third direction. Each antenna 5 has a dimension in a longitudinal direction smaller than the width of a corresponding one of the dents 7. Moreover, the width (dimension in a direction orthogonal to the longitudinal direction) of each antenna 5 is smaller than the dimension of the inner side surface 71 of a corresponding one of the dents 7 in a direction orthogonal to the width direction. Thus, each antenna 5 is accommodated in the dent 7 without extending beyond the dent 7. Each antenna 5 is attached to the inner side surface 71 of a corresponding one of the dents 7 with the two screws 52. Thus, the antenna 5 attached to the dent 7 is disposed at a location not overlapping the fixing member 4 in the thickness direction of the fixing member 4. "The location not overlapping the fixing member 4 in the thickness direction of the fixing member 4" is a location on an outer side of a projection image of the fixing member 4 projected onto a surface orthogonal to the third direction. Here, the third direction is orthogonal to a display surface of the display section 31 of the touch panel display 3. That is, the antenna 5 is not necessarily disposed in the accommodation space but may be disposed outside the accommodation space (e.g., outer side of the first housing 10 and the second housing 20). Moreover, the antenna 5 attached to the dent 7 is disposed at a location overlapping the fixing member 4 neither in the first direction nor in the second direction.

The second housing 20 is made of, for example, an electrically insulative material such as a synthetic resin material. The second housing 20 is attached to the rear surface 13 of the first housing 10. The second housing 20 includes a second attachment 21 and an accommodation section 22.

The accommodation section 22 has a box shape having an opening in a front surface thereof. Dimensions of the outer shape of the accommodation section 22 in the first direction and the second direction are respectively smaller than dimensions of the outer shape of the rear surface 13 of the first housing 10 in the first direction and the second direction. At least one of side surfaces and a rear surface of the accommodation section 22 has a through hole through which an electric wire is to be inserted.

The second attachment 21 has a quadrangular flat plate shape when viewed in the third direction. The second attachment 21 has a front surface 211 which is a surface in contact with the rear surface 13 of the first housing 10. The second attachment 21 has a rear surface 212 which is a surface exposed to the outer side.

The second attachment 21 has four recesses 213 (only two of which is shown in FIG. 3B) recessed toward the front surface 211 from the rear surface 212. The dimension of the opening in each of the four recesses 213 is larger than the head of the second screw 201. The four recesses 213 are provided at respective four corners of the second attachment 21. The four recesses 213 have holes penetrating through the second attachment 21. The holes in the four recesses 213 are coaxial with the four screw holes 131 in the first housing 10. Into the holes in the four recesses 213, respective thread portions of the second screws 201 are to be inserted. The second attachment 21 is fixed to the rear surface 13 of the first housing 10 by the four second screws 201.

The control board 6 is disposed in an inside space of the accommodation section 22. Moreover, in the inside space of the accommodation section 22, a power supply unit which is not shown is disposed rearwardly of the control board 6. The power supply unit converts alternating-current power externally supplied through an electric wire extending in the accommodation section 22 into direct-current power and supplies the direct-current power to the control board 6. The control board 6 and the power supply unit are attached to the accommodation section 22.

The control board 6 is a printed circuit board which is, for example, a glass epoxy board provided with a printed circuit, a microcontroller, and electronic components (e.g., memory, a capacitor, a coil, and a resistor). In the control board 6, for example, a microcontroller executes a program held in memory or the like thereby realizing a function of performing wireless communication via the antennas 5 and a function of controlling a display operation of the display section 31 of the touch panel display 3.

The control board 6 includes a plurality of (in this embodiment, four) connectors 61 (only two of which are shown in FIG. 3B). The plurality of connectors 61 correspond to the plurality of antennas 5 on a one-to-one basis, and the number of the connectors 61 is equal to the number of the antennas 5. Each connector 61 is connected to one end of the cable 62. The other end of the cable 62 is connected to the connector 51 of the antenna 5.

The cable 62 is, for example, a coaxial cable. The cable 62 is held by a cable clamp 63 attached to the front surface 211 of the second attachment 21. The cable clamp 63 is, for example, a strip plate formed of an elastic member and bent into a U-shape. The cable clamp 63 clips and holds the cable with a U-shaped portion. Flat surface portions of the U-shaped portion of the cable clamp 63 are attached to the front surface 211 of the second attachment 21 with a viscous member such as an adhesive or a double-sided tape. The cable clamp 63 can prevent the cable 62 from being disconnected by being pinched between the first housing 10 and the second housing 20.

The control board 6 is electrically connected to the display section 31 and the sensor 32 of the touch panel display 3 via a wire not shown. For example, when the control board 6 receives a sensing result from the sensor 32, the control board 6 causes a display content corresponding to the sensing result to be displayed on the display section 31. The displayed content of the display section 31 is, for example, held in memory of the control board, and the microcontroller reads, from the memory, a display content corresponding to the sensing result from the sensor 32 to display the display content in the display section 31.

(3) Mounting Frame, Attachment Member, Decorative Plate, and Plate Frame

Figure 4:
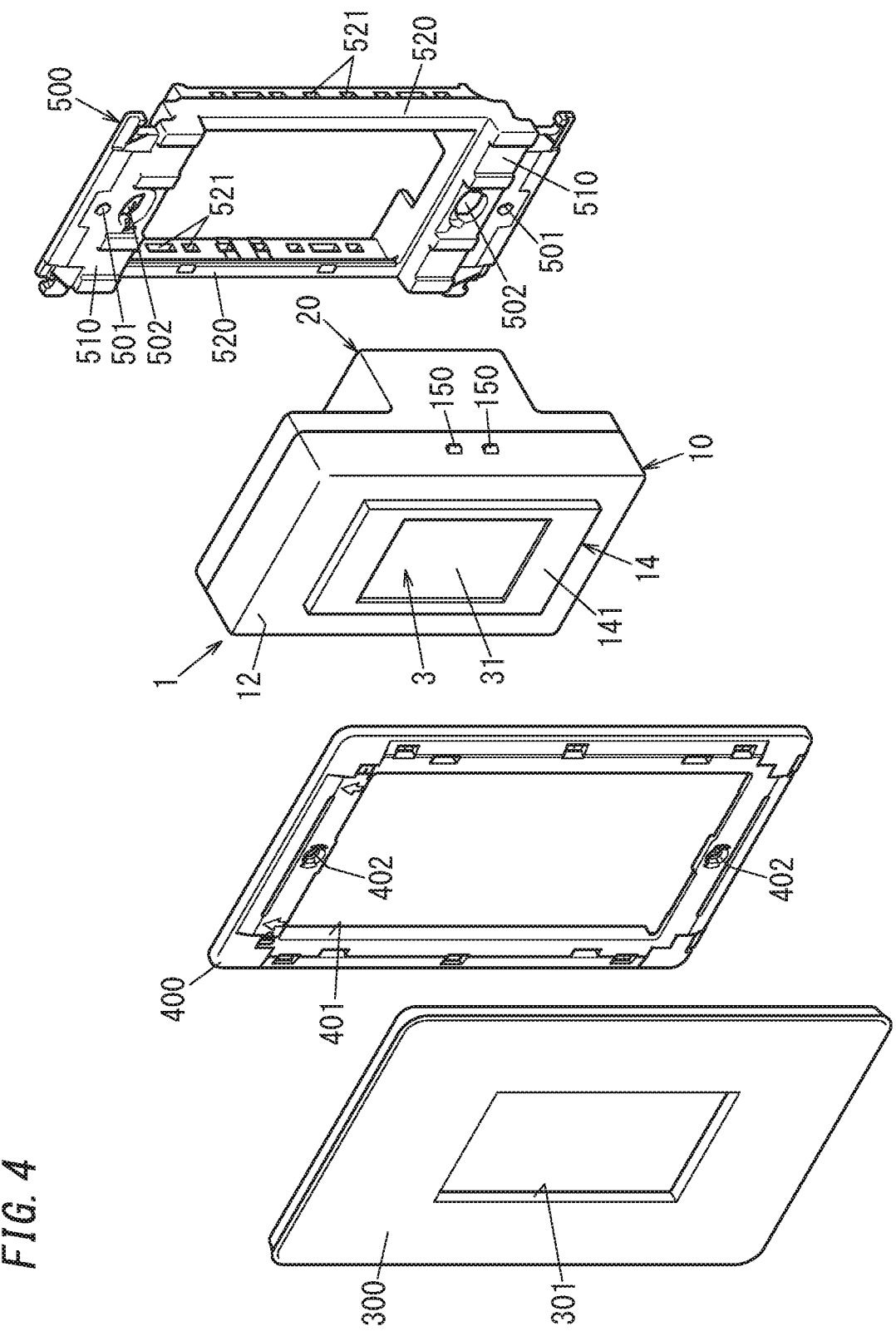
FIG. 4 is an exploded perspective view illustrating the implantable instrument, a mounting frame, a plate frame, and a decorative plate.

With reference to FIGS. 4 and 5, the mounting frame 500, an attachment member 8, a decorative plate 300, and a plate frame 400 will be described.

As illustrated in FIG. 5, the attachment member 8 is a member disposed to face a rear surface of the building member 200 and is fixed to a column or the like of the building B1 (see FIG. 1). The attachment member 8 is, for example, a switch box having a box shape having an opening in a front surface thereof. The attachment member 8 is made of, for example, an electrically insulating material such as a synthetic resin material. The attachment member 8 includes two support plates 80 protruding from edges of a front surface of the attachment member 8 so as to approach each other. Each support plate 80 has a screw hole into which a screw 81 is to be screwed.

The building member 200 has a hole which is quadrangular, and through the hole, front surfaces of the two support plates 80 of the attachment member 8 are exposed from the building member 200.

The mounting frame 500 is used to attach the implantable instrument 1 to the attachment member 8. As illustrated in FIG. 4, the mounting frame 500 is a quadrangular frame member having two first side parts 510 and two second side parts 520. Each of the two first side parts 510 has a screw hole 501 and a through hole 502. Each first side part 510 is in contact with the front surface of the building member 200 in a state where the screw 81 extending through the through hole 502 is screwed into the screw hole in the support plate

80 of the attachment member 8. Moreover, each first side part 510 supports the plate frame 400 with a screw screwed into the screw hole 501.

The two second side parts 520 have a plurality of attachment holes 521 aligned in the first direction. Each attachment hole 521 is provided such that each of the pair of claws 150 provided on the side surface of the first housing 10 of the implantable instrument 1 is inserted thereinto.

The plate frame 400 is a plate-like member and has a quadrangular outer shape when viewed in a thickness direction thereof. The plate frame 400 has an opening 401 which is quadrangular when viewed in the thickness direction. The plate frame 400 is, for example, made of a synthetic resin material. The opening 401 is provided so that the projection 14 of the first housing 10 protrudes through the first housing 10 of the implantable instrument 1 from the plate frame 400. The plate frame 400 has a through hole 402 through which a thread portion of a screw to be screwed into the screw hole 501 in the mounting frame 500.

The decorative plate 300 is a plate-like member and has a quadrangular shape when viewed in a thickness direction thereof. The decorative plate 300 is, for example, made of a synthetic resin material. The decorative plate 300 has an opening 301 which is quadrangular and which is in a central portion thereof when viewed in the thickness direction. The opening 301 is provided to expose the projection 14 of the first housing 10 and the touch panel display 3 from the decorative plate 300.

The four dents 7 are not necessarily formed in the first housing 10 but may be formed, for example, in both the first housing 10 and the second housing 20. In this case, each dent 7 is at least recessed in a direction separated away from the fixing member 4 in a state where the second housing 20 is fixed to the first housing 10. Alternatively, each dent 7 may be formed in the second housing 20 instead of the first housing 10.

The attachment member 8 may be made of, for example, a metal material other than the synthetic resin material. The four antennas 5 of the implantable instrument 1 are disposed at locations overlapping the attachment member 8 in the third direction. For example, a specific apparatus is disposed in a room (neighbor room) on an opposite side of the building member 200 in which the implantable instrument 1 is implanted, the attachment member 8 is disposed between the specific apparatus and each of the four antennas 5. Therefore, the attachment member 8 shields a radio wave for wireless communication between the specific apparatus and each of the four antennas 5. Thus, a gain obtained rearwardly of each antenna 5 is smaller than a gain obtained forwardly of each antenna 5. Thus, a direction in which the gain of each antenna 5 is relatively high may be set to the front. In this way, a space in which the implantable instrument 1 easily transmits and receive radio waves can be set in a space (e.g., in a room space of the room B11) located forwardly of the building member 200.

(4) Variation

First to fourth variations of the embodiment will be described below. In implantable instruments of the first to fourth variations, components similar to those in the implantable instrument 1 of the embodiment are denoted by the same reference signs as those in the embodiment, and the description thereof will be omitted.

The implantable instrument of the first variation is disposed to face a rear surface of a building member 200 and includes an attachment member 8 with which a first housing 10 is attached to the building member 200 in a state where the first housing 10 is exposed to a front surface of the building member 200. A plurality of (four) antennas 5 are disposed rearwardly of a portion (support plate 80) which is included in the attachment member 8 and which is in contact with the rear surface of the building member 200. For example, the first housing 10 is attached to another mounting frame configured such that the attachment holes 521 in the mounting frame 500 of the implantable instrument 1 of the embodiment are located further rearwardly of the second side parts 520 of the mounting frame 500. Thus, each antenna 5 may be disposed rearwardly of the support plate 80 of the attachment member 8, the support plate 80 being in contact with the rear surface of the building member 200. Alternatively, locations of a pair of claws 150 on the first housing 10 may be set in the vicinity of a front surface 12 of the first housing 10, and thereby, each antenna 5 may be disposed rearwardly of the support plate 80.

With this configuration, each antenna 5 is disposed in a space on an inner side of the attachment member 8. In this state, each antenna has gains smaller in the first direction and the second direction than in the third direction. Thus, the configuration enables a direction in which the gain of each antenna 5 is relatively high to be set as a direction along the third direction. In this way, a space in which the implantable instrument of the first variation easily transmits and receives radio waves can be set as a space (e.g., in a room space of the room B11) located forwardly of the building member 200. In particular, adopting the attachment member 8 made of a metal material enables an angle range in the third direction in which the gain of each antenna 5 is relatively high to be further narrowed.

Antennas 5 of the implantable instrument of the second variation are disposed in a second housing 20. The antennas 5 are fixed by, for example, screws to locations of a front surface 211 of the second housing 20, the locations facing dents 7 in a first housing 10. That is, in a state where the antennas 5 are fixed to the second housing 20, the second housing 20 is attached to the first housing 10, and thereby, the antennas 5 are disposed in the dents 7. Since a control board 6, and the antennas 5, and a cable clamp 63 are attached to the second housing 20, a worker easily attaches a cable 62 to each of the control board 6, the antennas 5, and the cable clamp 63.

Antennas 5 of an implantable instrument of a third variation are disposed on a decorative plate 300 covering part of a front surface 12 of a first housing 10. The antennas 5 are attached to a rear surface of the decorative plate 300 in place of the first housing 10 with, for example, a viscous material such as an adhesive. Note that the antennas 5 may be disposed in the decorative plate 300. In this case, the decorative plate 300 is formed in the antenna 5 by, for example, insert molding. The antennas 5 are disposed on the decorative plate 300, the antennas 5 and a control board 6 are electrically connected to each other via a cable 62 extending through a through hole penetrating through, for example, the first housing 10. Thus, the antennas 5 are disposed on an outer side of a fixing member 4.

The decorative plate 300 may be formed such that the outer shape of the decorative plate 300 viewed in a thickness direction thereof is slightly larger than the outer shape of an attachment member 8 viewed in the third direction. The antennas 5 are attached in a vicinity of an edge of the decorative plate 300, and thereby, the antennas 5 are disposed at locations not overlapping the attachment member 8 in the third direction. Thus, the antennas 5 easily perform wireless communication with a specific apparatus anterior to the attachment member 8. The specific apparatus anterior to the attachment member 8 is disposed in, for example, a room (neighbor room) on an opposite side of a building member 200 in which the implantable instrument of the third variation is implanted.

Note that the antennas 5 may be disposed on, for example, a mounting frame other than the decorative plate 300. The mounting frame 500 may be formed in the antennas 5 by, for example, insert molding.

With reference to FIGS. 6A and 6B, an implantable instrument 1A of a fourth variation will be described. Note that FIGS. 6A and 6B are schematic views, and the ratio of sizes and the ratio of thicknesses of components do not necessarily reflect actual dimensional ratios. Moreover, in FIG. 6A, illustration of a second housing 20A and a control board 6A is omitted for the sake of description.

The implantable instrument 1A includes the second housing 20A, the control board 6A, and four antennas 5 respectively in place of the second housing 20, the control board 6, and the four antennas 5 of the implantable instrument 1. Moreover, the implantable instrument 1A includes a connection substrate 9 in place of the cable 62 of the implantable instrument 1. The connection substrate 9 electrically connects the four antennas 5 to the control board 6A.

The connection substrate 9 is a substrate as a glass epoxy board provided with pattern wiring and has a quadrangular outer shape when viewed in a thickness direction thereof. The dimension of the connection substrate 9 in the first direction is larger than an interval between each two antennas 5 aligned in the first direction. The dimension of the connection substrate 9 in the second direction is larger than an interval between each two antennas 5 aligned in the second direction. The connection substrate 9 has four corners having through holes 93 through which thread portions of respective four second screws 201 are to be inserted.

The connection substrate 9 has a front surface 91 and a rear surface 92. The front surface 91 is provided with four first terminals 911. The rear surface 92 has a portion which is provided with four second terminals 921 and which faces the control board 6A.

The four first terminals 911 are provided at respective locations corresponding to third terminals 53 of four substrates 50A. The four first terminals 911 are contact terminals corresponding to the third terminals 53 of the four antennas 5 on a one-to-one basis. Each first terminal 911 includes, for example, a spring member being conductive and elastically deformable. Each first terminal 911 elastically deforms while being in contact with the third terminal of the substrate 50A, and resilient force of each first terminal 911 secures contact pressure on the third terminal 53.

The four second terminals 921 are contact terminals which come into contact with fourth terminals 64 of the control board 6A. The four second terminals 921 are contact terminals which come into contact with the four fourth terminals 64 on a one-to-one basis. Each second terminal 921 includes, for example, a spring member being conductive and elastically deformable. Each second terminal 921 elastically deforms while being in contact with the fourth terminal of the control board 6A, and resilient force of each second terminal 921 secures contact pressure on the fourth terminal 64.

The four first terminals 911 and the four second terminals 921 are provided in the pattern wiring formed on the connection substrate 9 and are electrically connected to each other on a one-to-one basis.

Each of the four substrates 50A includes the four third terminals 53 in place of the four connectors 51 of the antennas 5 of the implantable instrument 1. Each third terminal 53 is electrically connected to the pattern wiring of the substrate 50A and is electrically connected to the antenna 5. Each third terminal 53 is disposed on the substrate 50A so as to protrude from a surface of the substrate 50A and is in contact with a corresponding one of the first terminals 911.

The control board 6A includes the four fourth terminals 64 in place of the four connectors 61. Each fourth terminal 64 is disposed to protrude from a surface of the control board 6A toward a first housing 10 and is in contact with a corresponding one of the second terminals 921.

The second housing 20A has a recess 220 for accommodating the connection substrate 9. The recess 220 is recessed from a front surface 211 toward a rear surface 212 of a second attachment 21 of the second housing 20A. When viewed in a direction orthogonal to the front surface 211 of the second attachment 21, the recess 220 has an outer shape substantially the same as the outer shape of the connection substrate 9. The recess 220 has a depth substantially equal to the thickness of the connection substrate 9.

The connection substrate 9 stored in the recess 220 is supported by the second housing 20A. When the second housing 20A is attached to the first housing 10 with the second screws 201, the connection substrate 9 is sandwiched between the first housing 10 the second housing 20A. The four first terminals 911 come into contact with the respective four third terminals 53. Moreover, the four second terminals 921 come into contact with the respective four fourth terminals 64. Thus, the connection substrate 9 electrically connects the four antennas 5 to the control board 6A.

As described above, the implantable instrument 1A includes the connection substrate 9 disposed between the first housing 10 and the second housing 20A. The connection substrate 9 comes into contact with the antennas 5 via the front surface 91 (first surface) and comes into contact with the control board 6A via the rear surface 92 (second surface) to electrically connect the antennas 5 to the control board 6A.

With this configuration, simply attaching the second housing 20A to the first hosing 10 with the connection substrate 9 disposed between the first housing 10 and the second housing 20A enables the antennas 5 to be electrically connected to the control board 6A. This enables the connection substrate 9 to collectively connect the plurality of antennas 5 to the control board 6A.

The first terminals 911 and the third terminals 53 are not necessarily terminals, but the first terminals 911 or the third terminals 53 may be pattern wiring exposed on the substrate. In sum, the first terminals 911 and the third terminals 53 are at least configured to be electrically connected to each other. Similarly, the second terminals 921 and the fourth terminals 64 are not necessarily terminals, but the second terminals 921 or the fourth terminals 64 may be pattern wiring exposed on the substrate.

The connection substrate 9 and the control board 6A may be electrically connected to each other via, for example, a cable other than the second terminals 921 and the fourth terminals 64. Alternatively, the control board 6A may be configured to serve also as the connection substrate 9. For example, when the outer shape of the control board 6A viewed in a thickness direction thereof is similar to that of the connection substrate 9, and the control board 6A is provided with the four first terminals 911, the connection substrate 9 may be omitted.

The implantable instrument of each of the first to fourth variations is applicable to the implantable instrument 1 of the embodiment. For example, the plurality of antennas 5 may be attached to the second housing 20A of the fourth variation. Alternatively, for example, the connection substrate 9 may electrically connect the antennas 5 disposed on the decorative plate 300 to the control board 6A via a cable.

(5) Summary

As described above, an implantable instrument 1 of a first aspect includes a first housing 10, a second housing 20, a touch panel display 3, at least one antenna 5 (here, four antennas 5) for wireless communication, and a control board 6. The first housing 10 includes a front surface 12 having an opening 11. The second housing 20 is disposed to face a rear surface 13 of the first housing 10 to form an accommodation space between the first housing 10 and the second housing 20. The second housing 20 includes at least a part implanted in a building member 200. The touch panel display 3 includes a display section 31 having a plate-like shape and a fixing member 4 having a plate-like shape. The fixing member is disposed to face a rear surface of the display section 31. The fixing member 4 fixes the display section 31 to the first housing 10. The touch panel display 3 is disposed in the accommodation space such that the display section 31 is visually perceivable through the opening 11. The control board 6 has a function of performing wireless communication via the four antennas 5 and a function of controlling the display section in accordance with a communication content of the wireless communication. The control board is disposed in the accommodation space. The four antennas 5 are disposed at locations not overlapping the fixing member 4 in a thickness direction of the fixing member 4 (in this aspect, in a third direction).

With this configuration, the four antennas 5 are disposed at locations not overlapping the fixing member 4 in the thickness direction of the fixing member 4. Thus, the antennas 5 easily transmit and receive radio waves in the thickness direction of the fixing member 4. For example, the antennas 5 enable the radio waves to be transmitted and received via a space facing the front surface 12 of the first housing 10.

If the four antennas 5 are disposed at locations facing a rear surface of the fixing member 4 and overlapping the fixing member 4 in the thickness direction of the fixing member 4, radio waves output from the antennas 5 in the thickness direction of the fixing member 4 are likely to be shielded or attenuated by the fixing member 4. In this case, the radio waves from the antennas 5 are less likely to be output to the touch panel display 3. In contrast, the four antennas 5 in the implantable instrument 1 of the first aspect are disposed at locations not overlapping the fixing member 4 in the thickness direction of the fixing member 4. Thus, the fixing member 4 is less likely to shield the radio waves, and attenuation of the radio waves by the fixing member 4 is also less likely to occur. Therefore, for the implantable instrument 1, the status of wireless communication is not susceptible to be unstable.

Moreover, an effect of the implantable instrument 1 of the first aspect is that the four antennas 5 are disposed between the fixing member 4 and the rear surface 13 of the first housing 10. Thus, each antenna 5 easily transmits and receives a radio wave in a space facing the rear surface of the fixing member 4. That is, the four antennas 5 easily transmit and receive radio waves to all of the first to third directions.

Note that the number of antennas 5 for wireless communication included in the implantable instrument 1 is not limited to four. The implantable instrument 1 includes at least one antenna 5 for wireless communication, that is, includes an appropriate number of antennas 5. For example, at least two antennas 5 may configure a diversity antenna.

An implantable instrument 1 of a second aspect referring to the first aspect, at least one of the first housing 10 and the second housing 20 (in the present embodiment, the first housing 10) has at least one dent 7 (here, four dents 7) continuing to the accommodation space, and the antennas 5 are disposed in the dents 7. Thus, since the antennas 5 and the control board 6 are disposed in the accommodation space between the first housing 10 and the second housing 20, a worker does not come into contact with the antennas 5 and the control board 6 when the worker holds the implantable instrument 1. Therefore, a loose connection between each antenna 5 and the control board 6 is less likely to occur during work by the worker, which improves reliability of an electrical connection between each antenna 5 and the control board 6.

Note that the number of the dents 7 is not limited to four but may be any number corresponding to the number of the antennas 5. For example, when the implantable instrument 1 includes at least one antenna 5, at least one dent 7 is provided.

Each dent 7 is not necessarily provided between a corresponding one of the four inner side surfaces 161 of the second recess 16 and the rear surface 13 of the first housing 10. For example, the size of a quadrangle defined by the four inner side surfaces 161 of the second recess 16 when viewed in the third direction may be larger than the outer shape of the fixing member 4 in the touch panel display 3 to form a gap between the fixing member 4 and the first housing 10, and the gap may serve as the dent 7. In this case, the antennas 5 may be aligned with the fixing member 4 in the first direction or may be aligned with the fixing member 4 in the second direction. Alternatively, for example, each dent 7 may be disposed between a bottom surface of the second recess 16 and the front surface 12 of the first housing 10. In this case, each antenna 5 may be disposed forwardly of the fixing member 4.

An implantable instrument 1 of a third aspect referring to the second aspect, the at least one antenna 5 includes a plurality of (four) antennas, and the at least one dent 7 includes a plurality of (four) dents 7 corresponding to the plurality of antennas 5 on a one-to-one basis. Thus, all the antennas 5 each corresponding to an associated one of the dents 7 are fixed to the first housing 10 without overlapping the fixing member 4 in the thickness direction of the fixing member 4 in a state where the antennas 5 are separated away from the fixing member 4. Moreover, the antennas 5 each disposed in a corresponding one of the dents 7 are disposed in the accommodation space between the first housing 10 and the second housing 20, and therefore, the antennas 5 are easily electrically connecting to the control board 6 disposed in the accommodation space.

An effect of the implantable instrument 1 of the third aspect is that since the implantable instrument 1 includes the four antennas 5, signal intensity in transmission and reception of radio waves can be increased due to a diversity effect more than in a case of one antenna 5. Moreover, since the implantable instrument 1 includes the four antennas 5, it is also possible to transmit and receive a radio wave different for each of the four antennas 5. Alternatively, for example, the implantable instrument 1 may transmit and receive a first radio wave via two of the four antennas 5, the two antennas 5 being transverse to each other, and the implantable instrument 1 may transmit and receive a second radio wave in a frequency band different from the first radio wave via the remaining two antennas 5. The two antennas 5 transverse to tach other enable the signal intensity for transmission and reception of the first radio wave (or the second radio wave) to be more stabilized than in the case of one antenna 5.

An implantable instrument 1 of a fourth aspect referring to any one of the first to third aspect further includes an attachment member 8 which is disposed to face a rear surface of the building member 200 and with which the first housing 10 is attached to the building member 200 in a state where the first housing 10 is exposed at a front surface of the building member 200. The antennas 5 are disposed forwardly of a portion (in this aspect a support plate 80) of the attachment member 8, the portion being in contact with the rear surface of the building member 200. Thus, the antennas 5 more easily transmit and receive radio waves in a space at the front surface of the building member 200 than in a space at the rear surface of the building member 200.

An effect of the implantable instrument 1 of the fourth aspect is that when the four antennas 5 are disposed forwardly of a front surface of the support plate 80 of the attachment member 8 as illustrated in FIG. 5, each of the four antennas 5 more easily transmits and receives a radio wave in a space located forwardly of the building member 200 than in a space located rearwardly of the building member 200. For example, each of the four antennas 5 more easily transmits and receives a radio wave in a room space of the room B11 (see FIG. 1) than in the space located rearwardly of the building member 200, and wireless communication with a specific apparatus disposed in the room B11 is thus not susceptible to be unstable. Moreover, even when the attachment member 8 is made of a metal material, the wireless communication between each of the four antennas 5 and the specific apparatus is not susceptible to be unstable because the attachment member 8 is not disposed between the specific apparatus disposed in the room B11 and each of the four antennas 5.

An implantable instrument 1 of a fifth aspect referring to any one of the first to third aspect further includes an attachment member 8 which is disposed to face a rear surface of the building member 200 and with which the first housing 10 is attached to the building member 200 in a state where the first housing 10 is exposed at a front surface of the building member 200. The antennas 5 are disposed rearwardly of a portion (in this aspect a support plate 80) of the attachment member 8, the portion being in contact with the rear surface of the building member 200.

An implantable instrument 1A of a sixth aspect referring to any one of the first to fifth aspects further includes a connection substrate 9 disposed between the first housing 10 and the second housing 20. The connection substrate 9 comes into contact with the antennas 5 via a front surface 91 (first surface) of the connection substrate 9 and comes into contact with the control board 6A via a rear surface 92 (second surface) of the connection substrate 9 to electrically connect the antennas 5 to the control board 6A.

An implantable instrument 1 of a seventh aspect referring to any one of the first to sixth aspects, each antenna 5 is a conductor provided on a surface of a substrate 50. Thus, for example, the substrate 50 provided with pattern wiring may be used as the antenna 5. Moreover, simply fixing the substrate 50 to the dent 7 enables the antenna 5 to be disposed in the dent 7. Therefore, each antenna 5 is easily attached to the dent 7.

Each antenna 5 is not necessarily disposed in the dent 7 such that the surface of the substrate 50 is parallel to the third direction. Each antenna 5 may be disposed in the dent 7 such that the surface of the substrate 50 is transverse to the third direction. In other words, each antenna 5 may be disposed in the dent 7 such that the surface of the substrate 50 is parallel to the display surface of the display section 31 of the touch panel display.

In an implantable instrument 1 of an eighth aspect referring to any one of the first to seventh aspects, the antennas 5 are disposed in the first housing 10. Thus, the antennas 5 are disposed at locations closer to the front surface 12 of the first housing 10 than in a case of being disposed in the second housing 20. Therefore, the antennas 5 easily transmit and receive radio waves in a space located forwardly of the building member 200.

In an implantable instrument 1 of an ninth aspect referring to any one of the first to seventh aspects, the antennas 5 are disposed in the second housing 20.

In an implantable instrument 1 of a tenth aspect referring to the first aspect, the antennas 5 are disposed on a decorative plate 300 covering part of the front surface 12 of the first housing 10.

The outer shape of each of the first housing 10, the opening 11, the first attachment 41 of the fixing member 4, the first recess 15, and the second recess 16 is not limited to the quadrangular shape but may be any shape such as a polygonal shape or a circular shape.

Each antenna 5 is, for example, a pattern antenna formed on the substrate 50 but is not limited to this configuration. Each antenna 5 may be an antenna, such as a coil antenna, including an electric wire. Each antenna 5 is not necessarily disposed in the accommodation space formed by the first housing 10 and the second housing 20 but may be disposed between the first housing 10 and the second housing 20. Alternatively, each antenna 5 may be disposed, for example, between the first housing 10 and the decorative plate 300, or disposed outside the first housing 10 and the second housing 20.

When the implantable instrument 1 is configured to be directly attached to the attachment member 8 with screws or the like, the mounting frame 500 may be omitted.

The wireless communication function of the control board 6 is not limited to transmission and reception of radio waves via the antennas 5, but the wireless communication function may be only a transmission function of radio waves and a reception function may be omitted.

REFERENCE SIGNS LIST 1, 1A IMPLANTABLE INSTRUMENT
10 FIRST HOUSING
11 OPENING
20, 20A SECOND HOUSING
22 ACCOMMODATION SECTION
3 TOUCH PANEL DISPLAY
31 DISPLAY SECTION
4 FIXING MEMBER
5 ANTENNA
6, 6A CONTROL BOARD
7 DENT
8 ATTACHMENT MEMBER
200 BUILDING MEMBER
300 DECORATIVE PLATE

The invention claimed is:

1. An implantable instrument, comprising:
a first housing having a front surface having an opening;
a second housing disposed to face a rear surface of the first housing to form an accommodation space between the first housing and the second housing, the second housing including at least a part implanted in a building member;
a touch panel display including a display section having a plate-like shape and a fixing member having a plate-like shape, the fixing member being disposed to face a rear surface of the display section, the fixing member fixing the display section to the first housing, the touch panel display being disposed in the accommodation space such that a front surface of the display section is visually perceivable through the opening;

at least one antenna for wireless communication; and a control board having a function of performing wireless communication via the at least one antenna and a function of controlling the display section in accordance with a communication content of the wireless communication, the control board being disposed in the accommodation space, the at least one antenna being disposed at a location not overlapping the fixing member in a thickness direction of the fixing member.

2. The implantable instrument of claim 1, wherein at least one of the first housing and the second housing has at least one dent continuing to the accommodation space, and the at least one antenna is disposed in the at least one dent.

3. The implantable instrument of claim 2, wherein the at least one antenna includes a plurality of antennas, and the at least one dent includes a plurality of dents corresponding to the plurality of antennas on a one-to-one basis.

4. The implantable instrument of claim 1, further comprising:

an attachment member which is disposed to face a rear surface of the building member and with which the first housing is attached to the building member in a state where at least part of the first housing is exposed at a front surface of the building member, wherein the at least one antenna is disposed forwardly of a portion of the attachment member, the portion being in contact with the rear surface of the building member.

5. The implantable instrument of claim 1, further comprising:

an attachment member which is disposed to face a rear surface of the building member and with which the first housing is attached to the building member in a state where the first housing is exposed at a front surface of the building member, wherein the at least one antenna is disposed rearwardly of a portion of the attachment member, the portion being in contact with the rear surface of the building member.

6. The implantable instrument of claim 1, further comprising:

a connection substrate disposed between the first housing and the second housing, the connection substrate comes into contact with the at least one antenna via a first surface of the connection substrate and comes into contact with the control board via a second surface of the connection substrate to electrically connect the at least one antenna to the control board.

7. The implantable instrument of claim 1, wherein the at least one antenna is a conductor formed on a surface of a substrate.

8. The implantable instrument of claim 1, wherein the at least one antenna is disposed in the first housing.

9. The implantable instrument of claim 1, wherein the at least one antenna is disposed in the second housing.

10. The implantable instrument of claim 1, wherein the at least one antenna is disposed on a decorative plate covering part of the front surface of the first housing.

11. The implantable instrument of claim 2, further comprising:

an attachment member which is disposed to face a rear surface of the building member and with which the first housing is attached to the building member in a state where at least part of the first housing is exposed at a front surface of the building member, wherein the at least one antenna is disposed forwardly of a portion of the attachment member, the portion being in contact with the rear surface of the building member.

12. The implantable instrument of claim 3, further comprising:

an attachment member which is disposed to face a rear surface of the building member and with which the first housing is attached to the building member in a state where at least part of the first housing is exposed at a front surface of the building member, wherein the at least one antenna is disposed forwardly of a portion of the attachment member, the portion being in contact with the rear surface of the building member.

13. The implantable instrument of claim 2, further comprising:

an attachment member which is disposed to face a rear surface of the building member and with which the first housing is attached to the building member in a state where the first housing is exposed at a front surface of the building member, wherein the at least one antenna is disposed rearwardly of a portion of the attachment member, the portion being in contact with the rear surface of the building member.

14. The implantable instrument of claim 3, further comprising:

an attachment member which is disposed to face a rear surface of the building member and with which the first housing is attached to the building member in a state where the first housing is exposed at a front surface of the building member, wherein the at least one antenna is disposed rearwardly of a portion of the attachment member, the portion being in contact with the rear surface of the building member.

15. The implantable instrument of claim 2, further comprising:

a connection substrate disposed between the first housing and the second housing, the connection substrate comes into contact with the at least one antenna via a first surface of the connection substrate and comes into contact with the control board via a second surface of the connection substrate to electrically connect the at least one antenna to the control board.

16. The implantable instrument of claim 3, further comprising:

a connection substrate disposed between the first housing and the second housing, the connection substrate comes into contact with the at least one antenna via a first surface of the connection substrate and comes into contact with the control board via a second surface of the connection substrate to electrically connect the at least one antenna to the control board.

17. The implantable instrument of claim 4, further comprising:

a connection substrate disposed between the first housing and the second housing, the connection substrate comes into contact with the at least one antenna via a first surface of the connection substrate and comes into contact with the control board via a second surface of the connection substrate to electrically connect the at least one antenna to the control board.

18. The implantable instrument of claim 5, further comprising:
- a connection substrate disposed between the first housing and the second housing, the connection substrate comes into contact with the at least one antenna via a first surface of the connection substrate and comes into contact with the control board via a second surface of the connection substrate to electrically connect the at least one antenna to the control board.

19. The implantable instrument of claim 2, wherein the at least one antenna is a conductor formed on a surface of a substrate.

20. The implantable instrument of claim 3, wherein the at least one antenna is a conductor formed on a surface of a substrate.

* * * * *